(12) United States Patent
Blin

(10) Patent No.: US 11,939,999 B2
(45) Date of Patent: Mar. 26, 2024

(54) FASTENER

(71) Applicant: WHEELGUARD GMBH, Wildeshausen (DE)

(72) Inventor: Jorg Blin, Wildeshausen (DE)

(73) Assignee: WHEELGUARD GMBH, Wildeshausen (DE)

( * ) Notice: Subject to any disclaimer, the term of this patent is extended or adjusted under 35 U.S.C. 154(b) by 498 days.

(21) Appl. No.: 17/272,084

(22) PCT Filed: Aug. 14, 2019

(86) PCT No.: PCT/EP2019/071790
§ 371 (c)(1),
(2) Date: Feb. 26, 2021

(87) PCT Pub. No.: WO2020/043491
PCT Pub. Date: Mar. 5, 2020

(65) Prior Publication Data
US 2021/0317861 A1  Oct. 14, 2021

(30) Foreign Application Priority Data

Aug. 29, 2018 (DE) .................... 20 2018 004 013.4
Dec. 3, 2018 (DE) .................... 20 2018 106 864.4

(51) Int. Cl.
*F16B 31/02* (2006.01)
*F16B 35/04* (2006.01)
(Continued)

(52) U.S. Cl.
CPC ............ *F16B 31/02* (2013.01); *F16B 35/048* (2013.01); *F16B 35/06* (2013.01); *G01L 5/24* (2013.01); *G08C 17/02* (2013.01); *B60B 3/16* (2013.01)

(58) Field of Classification Search
CPC ........ F16B 31/02; F16B 35/048; F16B 35/06; F16B 41/002; F16B 41/005; G01L 5/24; B60B 3/16
See application file for complete search history.

(56) References Cited

U.S. PATENT DOCUMENTS 2,503,141 A    4/1950  Stone
7,293,466 B2 *  11/2007  Ohta .................... G01L 5/0004
                                                    73/761
(Continued)

FOREIGN PATENT DOCUMENTS

DE    102010001144 A1    7/2011
DE    102014217076 A1    3/2016
(Continued)

*Primary Examiner* — Francis C Gray
(74) *Attorney, Agent, or Firm* — MUNCY, GEISSLER, OLDS & LOWE, P.C.

(57) ABSTRACT

A fastener, in particular of a chassis component, has at least one sensor and at least one transmitter of a monitoring device for monitoring at least one mechanical fastening parameter. At least one power supply unit is associated with the transmitter, that the transmitter and the power supply unit are connected to one another by means of a switching contact, that an electrical connection can be closed by means of the switching contact, that the switching contact is designed in such a way that the electrical connection is open when the fastener is installed properly and is closed only when the fastener is released, and that the transmitter is supplied with current and transmits a signal only when the electrical connection of the switching contact is closed.

14 Claims, 10 Drawing Sheets

(51) Int. Cl.
*F16B 35/06* (2006.01)
*G01L 5/24* (2006.01)
*G08C 17/02* (2006.01)
*B60B 3/16* (2006.01)

(56) References Cited

U.S. PATENT DOCUMENTS

| | | |
|---|---|---|
| 7,412,898 B1 | 8/2008 | Smith et al. |
| 8,540,468 B2 * | 9/2013 | Mekid ..................... F16B 31/02 |
| | | 73/761 |
| 9,645,061 B2 * | 5/2017 | Hsieh ........................ G01N 3/08 |
| 9,964,134 B1 * | 5/2018 | Tran ...................... F16B 31/025 |
| 10,468,147 B2 * | 11/2019 | Sironi ........................ G21F 5/12 |
| 11,149,777 B2 * | 10/2021 | Madru .................... G01B 11/16 |
| 2007/0204699 A1 | 9/2007 | Salvo et al. |
| 2019/0249706 A1 * | 8/2019 | Hess ...................... F16B 31/025 |
| 2020/0173875 A1 * | 6/2020 | Campbell ............... G01L 5/101 |

FOREIGN PATENT DOCUMENTS

| | | | | |
|---|---|---|---|---|
| EP | 2803871 A1 | 11/2014 | | |
| EP | 2803871 B1 * | 11/2016 | ............. | F16B 31/02 |
| KR | 2231041 B1 * | 3/2021 | ............. | F16B 31/02 |
| RU | 2412064 C1 | 2/2011 | | |
| RU | 2593738 C2 | 8/2016 | | |
| WO | WO-2022080884 A1 * | 4/2022 | ............. | F16B 31/02 |

* cited by examiner

FASTENER

FIELD OF DISCLOSURE

The invention relates to a fastener, in particular of a chassis component, having at least one sensor and at least one transmitter of a monitoring device for monitoring at least one mechanical fastening parameter, wherein at least one power supply unit is associated with the transmitter, wherein the transmitter and the power supply unit are connected to one another by means of a switching contact, wherein an electrical connection can be closed by means of the switching contact, wherein the switching contact is designed in such a way that the electrical connection is open when the fastener is installed properly and is closed only when the fastener is released, and wherein the transmitter is supplied with current and transmits a signal only when the electrical connection of the switching contact is closed, wherein an actuating element is associated with the switching contact, wherein the actuating element has a bias, and wherein the actuating element is designed in such a way that the electrical connection of the switching contact is opened when a force is applied against the bias. The invention further also relates to a device for monitoring a mechanical fastening.

BACKGROUND OF THE INVENTION

Such a fastener is known from DE 10 2014 217 076 A1. It is to be suitable to monitor the fastening of a wheel to a wheel suspension. According to DE 10 2014 217 076 A1, a base unit comprising a signal processing unit can be coupled to a sensor arrangement, wherein the sensor arrangement is to be associated with a corresponding fastener. Different sensors, for example a pressure sensor or a position sensor, are thereby mentioned as sensor arrangement, wherein, in a further design, all sensor arrangements are to have in common that a current contact pressure or the presence of a contact, respectively, between parts, which are to be fastened to one another, is detected as parameter. The current state monitoring according to DE 10 2014 217 076 A1 thereby requires a constant signal transmission between the signal processing unit and the sensor arrangement, so that a permanent current supply of the sensor arrangement has to be ensured. The sensor unit therefore has an electrical power source, which is to preferably be a power production unit, in order to ensure a permanent power supply and signal transmission.

A mechanical connecting member is further known from DE 10 2010 001 144 A1. This mechanical connecting member has a sensor layer for reading out, for example, a tightening torque. Information relating to a mechanical stress on the connecting member determined via the sensor layer is thereby captured and read out via a wireless interface. A corresponding permanent power supply is to thus likewise be associated with the mechanical connecting member.

From EP 2 803 871 A1 an intelligent fastener is to be taken, which has a head section, in which an RFID tag, an antenna and a sensor are arranged in a recess. Further, the head section has a through-hole within which an arm section of the sensor is to be slidably arranged parallel to a longitudinal extension of the fastener. With the arm area, a microswitch of the sensor shall then be switchable between two states, the states reflecting whether the fastener is fixed or has come loose.

BRIEF SUMMARY OF THE INVENTION

It is the object of the invention to further develop a fastener of this type to the effect that the monitoring device uses as little power as possible, and the function thereof is thus ensured for a long period of time and the monitoring device can be adapted to or integrated into differently shaped fasteners.

The solution of this object takes place by means of a fastener according to the features of claim 1 and a device according to the features of claim 11. Further developments and advantageous designs are specified in the dependent claims.

According to the invention, the fastener, in particular of a chassis component, having at least one sensor and at least one transmitter of a monitoring device for monitoring at least one mechanical fastening parameter, wherein at least one power supply unit is associated with the transmitter, wherein the transmitter and the power supply unit are connected to one another by means of a switching contact, wherein an electrical connection can be closed by means of the switching contact, wherein the switching contact is designed in such a way that the electrical connection is open when the fastener is installed properly and is closed only when the fastener is released, and wherein the transmitter is supplied with current and transmits a signal only when the electrical connection of the switching contact is closed, wherein an actuating element is associated with the switching contact, wherein the actuating element has a bias, and wherein the actuating element is designed in such a way that the electrical connection of the switching contact is opened when a force is applied against the bias is characterized in that the actuating element is a spring-loaded pin, which is inclined at an angle to an axis of rotation of a thread of the fastener in such a way that the pin can be displaced in the direction of the axis of rotation.

Due to the fact that the switching contact of the transmitter is not closed when the fastener is installed properly and the transmitter is thus not supplied with current, the transmitter cannot transmit a signal and does not consume any current from the power supply unit. The transmitter is therefore deactivated. A power store provided as power supply unit can thus ensure the power supply of the transmitter for a long period of time in the event that the fastener releases. The fastener can thereby serve, for example, for fastening a wheel to a wheel suspension. In the event that the wheel releases from the wheel suspension, the switching contact is closed and the transmitter transmits a signal, in particular a warning signal.

To close and to open the switching contact, an actuating element is associated with the switching contact. The actuating element has a bias, so that the actuating element is held in a predetermined position as a function of an installation position of the fastener. If the fastener is installed properly, the actuating element is thereby advantageously under tension and is relaxed when the fastener is released.

In a further design, the actuating element is designed in such a way that the electrical connection of the switching contact is opened when a force is applied against the bias. The force against the bias can thereby be effected on the actuating element by means of a pressure of the object, which is to be fastened, or a receptacle or a mount, respectively, to which the object to be fastened is to be fastened. When this pressure drops, the actuating element then relaxes, and the electrical switching contact is closed.

According to a preferred embodiment, the actuating element is a spring-loaded pin, which can be displaced parallel to an axis of rotation of a thread of the fastener. When the fastener is connected to a corresponding thread when properly installed in the direction of the axis of rotation of the thread, a contact section can be formed in a particularly simple manner at the receptacle or mount, which have the corresponding thread. This contact section of the receptacle or mount then pushes against the fastening element, which is formed as spring-loaded pin. In a further design, the receptacle or the mount can be, for example, a wheel bolt or a receptacle of a wheel suspension or of a wheel carrier, respectively.

Further, the actuating element is a spring-loaded pin, which is inclined at an angle to an axis of rotation of a thread of the fastener in such a way that the pin can be displaced in the direction of a central area of the fastener, in particular can be displaced in the direction of the axis of rotation. It is possible with such an arrangement that the contact section at the receptacle of the mount can also be formed laterally to the fastener and provides for an actuation of the switching contact in the same way when screwing in the fastener.

The switching contact is preferably formed by means of two ends of metallic strips, wherein the switching contact is closed when ends of the metallic strips are connected to one another. In a further design, at least one of these metallic strips is formed in a bent manner and forms a one-sided lever. This one-sided lever is arranged in such a way that the switching contact is closed due to its internal stress in an initial position, in particular that the lever of the switching contact closes the switching contact due to its internal stress in an initial position. In this initial position, the transmitter is then supplied with current via the power supply unit.

In a further design, the lever of the switching contact and the actuating element are arranged relative to one another in such a way that, when the switching contact is open, the actuating element pushes against the lever and deflects the latter against its internal stress, in particular deflects it in such a way that the switching contact is open. When the switching contact is open, the actuating element as well as the lever of the switching contact are thus under tension, in particular under the largest possible tension. According to a further development, the transmitter provides for a wireless signal transmission to a receiver. The fastener thus does not need to be connected directly to the receiver, and the transmitter can still transmit, even when the fastener is released or removed completely, respectively. Suitable standards for a wireless signal transmission are, for example, radio signals or Bluetooth.

A particularly advantageous arrangement of the monitoring device in or at the fastener results when the monitoring device is installed in the fastener at an outer head end thereof. Even in the case of installed or partially installed fastener, respectively, the transmitter is thus surrounded by as little material as possible, so that the transmitter can already transmit a signal, which can be received by a receiver, with a low signal strength. In particular also when the fastener is only partially released and if this could not be readily detected by means of an optical observation.

According to a further development, at least the transmitter and the switching contact of the monitoring device can furthermore be arranged in a chamber, which is sealed to the outside. The sealed chamber ensures a largest possible protection against contaminations, such as dust, lubricant, and dirt, which can negatively impact a proper function of the switching contact. A protection against forces acting from the outside is moreover created by means of the arrangement of the transmitter and of the switching contact in the chamber, so that these forces cannot lead to damages to the parts, which are arranged in the chamber. In addition to the transmitter and the switching contact, in particular the power supply unit, in particular the power store, can also be arranged in the chamber. To be able to optionally replace the power supply unit, in particular the power store, said power store can also be arranged in a further chamber, which can be accessed from the outside.

In the case of all embodiments of the fastener with a chamber, the actuating element is advantageously always guided out of the chamber in order to be able to exert pressure on said fastener. A feedthrough provided for the actuating element needs to therefore be sealed, so that it is ensured that no dust, lubricant, or dirt can penetrate into the chamber.

Due to the fact that the fastener is provided in particular for the fastening of a chassis component and in particular for the fastening of a wheel to a wheel suspension, the fastener according to a first preferred embodiment is a wheel screw. This embodiment is used mostly in passenger cars.

In the case of an embodiment with wheel screw, the monitoring device is then advantageously integrated therein in such a way that in the thread, the wheel screw has a recess, which extends in the direction of the axis of rotation of its thread and in which the actuating element of the switching contact is guided. In that the recess of the actuating element extends in the direction of the axis of rotation of the thread, a positive guidance of the actuating element results. When screwing the wheel screw into the corresponding thread of a wheel suspension, pressure is then exerted onto the actuating element by means of a contact section of the wheel suspension, wherein the actuating element is displaced in the direction of the head end of the fastener. The actuating element, which is displaced in the direction of the head end of the fastener, then interrupts the switching contact between power supply unit and transmitter.

In a further design, the recess is thereby arranged at a head-side end of the thread, in order to be able to in particular also capture small positional changes of the wheel screw. It is sufficient thereby when, starting at the head-side end of the thread in the direction of an end of the thread, which is to be screwed in, the recess extends only over a partial region of the entire thread.

In the case of a wheel screw according to the invention, the actuating element of the switching contact can further also be guided out of the interior of the wheel screw to the outside at a conical to spherical contact surface of the wheel screw, which is formed between the head and thread of said wheel screw. Due to the fact that when properly used, the conical to spherical contact surface abuts holohedrally against a contact section, in particular a screw receptacle or a wheel rim, in the region, in which the actuating element of the switching contact is guided out of the wheel screw to the outside, it is attained in a simple way that the actuating element is contaminated less. Less contamination at the actuating element then also decreases the likelihood that the actuating element gets struck due to a contamination, and that the contamination thus leads to a functional impairment.

According to a second embodiment of the invention the fastener is a wheel nut. Such a fastener is in particular suitable to fasten and to secure wheels to a wheel suspension with stay bolts. Such connections are prevalent in particular in the case of trucks and other utility vehicles.

In a further design of the invention, the wheel nut can then have an internal front protrusion at a head-side end of its thread, at or in which an actuating element of the switching contact is held. Analogously to the first embodiment as wheel screw, the actuating element is thereby positively guided at or in the front protrusion. The positive guidance of the actuating element thus provides for a movement of the actuating element parallel to an axis of rotation of the thread or the wheel nut.

The front protrusion thereby advantageously extends in a radial plane to the axis of rotation and can preferably be formed as circumferential front ring or front plate. If the front protrusion is formed as front plate, the front plate can simultaneously limit the chamber towards the thread, in which the switching contact is arranged.

The invention further also relates to a device for monitoring a mechanical fastening, in particular of a chassis component, comprising at least one monitoring device, which has at least one sensor and at least one transmitter, and a notification device, which has a receiver associated with the transmitter of the monitoring device, a data processing unit, and an output unit. According to the invention, this device for monitoring a mechanical fastening is characterized in that the monitoring device is installed in an above-mentioned fastener.

In the event of a signal transmitted by a transmitter of a released fastener, a corresponding processing and conditioning of the signal takes place via the notification device. The processing and conditioning thereby comprises the receiving and testing of a corresponding signal, which is preferably transmitted wirelessly from the transmitter to the receiver. If the testing of the signal in the data processing unit shows that a fastener has released from its proper installed position, the data processing unit transmits corresponding information to the output unit.

According to a further development of the device, the output unit has means, by means of which a direct output of a warning or a transfer of corresponding information relating to the state of the mechanical connecting parameter is possible. A warning relating to a state of the mechanical connecting parameter or of the fastener can then take place via at least one of the following options: push message, e-mail, SMS, online register, acoustic warning, or optical warning, whereby the listed options are not complete. A transfer of information thereby preferably takes place in response to a warning by means of push message, e-mail, SMS, or online register, whereby the transfer then preferably takes place via mobile radio networks or known standards for the mobile internet. Different options of warnings can also be combined with one another, in order to ensure that a corresponding warning is perceived as quickly as possible.

If chassis components of a vehicle are monitored, for example the connection of wheel and wheel suspension, the notification device is advantageously installed directly into the vehicle, whereby one or several data processing units of the vehicle, which are already present, can potentially be used. Therefore, only one output unit comprising, for example, a warning light and/or an acoustic warning device, as well as a corresponding receiver then need to be provided in the case of new vehicles. The output unit is then advantageously integrated completely into a vehicle.

According to a further development of the device, the installation of a complete, self-contained notification device is advisable for the retrofitting in an existing vehicle, in particular such a notification device, which transfers information relating to the output unit or which transmits an acoustic signal, in order to be able to arrange the notification device in an engine compartment or under a trim of a passenger compartment of a vehicle.

To ensure that the wireless transmission is not disrupted by external signals, it can moreover be provided according to a further development that the wireless signal transmission takes place in an encrypted manner. This facilitates the detection of a corresponding signal from the transmitter of the fastener by the receiver of the notification device.

The fastener formed as wheel nut, as well as the fastener formed as wheel screw, is moreover suitable as anti-theft protection, whereby a notification is then generated, which is transferred by the output unit. An owner can thus also be informed when he is not in the vicinity of the vehicle. The owner can then initiate corresponding steps, for example notify the police. Contrary to the function, in the case of which the secure fastening of a chassis component, for example of a wheel to a wheel suspension, is monitored and in the case of which all fasteners of the chassis component have to have a corresponding monitoring device, a single fastener for each wheel and wheel suspension is sufficient for the function of the anti-theft protection.

BRIEF DESCRIPTION OF THE DRAWING

An exemplary embodiment of the invention, from which further features can result, which are essential for the invention, is illustrated in the drawing, in which.

DETAILED DESCRIPTION OF THE INVENTION

Figure 1:
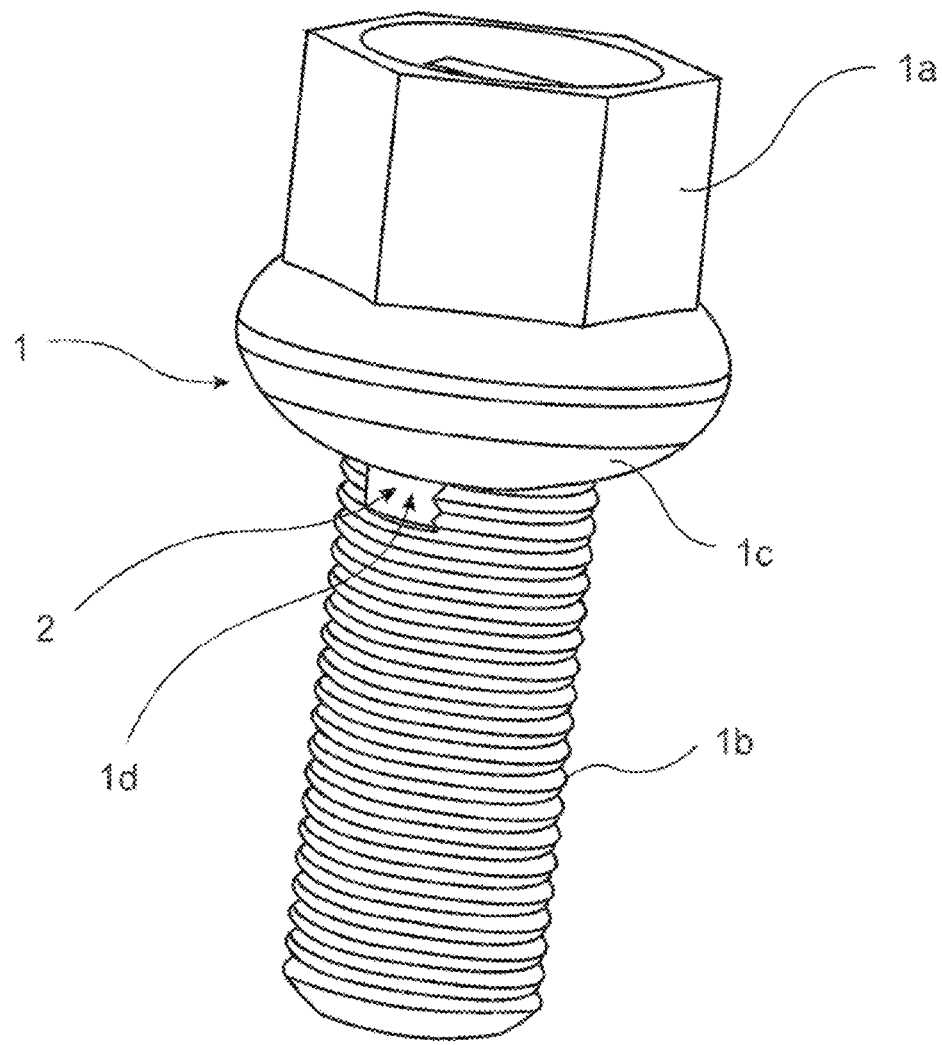
FIG. 1: shows a first perspective view of a first embodiment of a fastener according to the invention.

A fastener according to the invention in the embodiment as wheel screw 1 is illustrated in FIG. 1. This wheel screw 1 has a head 1a, which is formed in hexagonal shape. A conical to spherical contact surface 1c, which is formed so as to taper towards the thread 1b, is provided between the head 1a and a thread 1b of the wheel screw 1. In a boundary region between the conical to spherical contact surface 1c and the thread 1b, the thread 1b has a recess 1d, which extends in the direction of the axis of rotation of the thread 1b and in which an actuating element 2 is guided.

Figure 2:
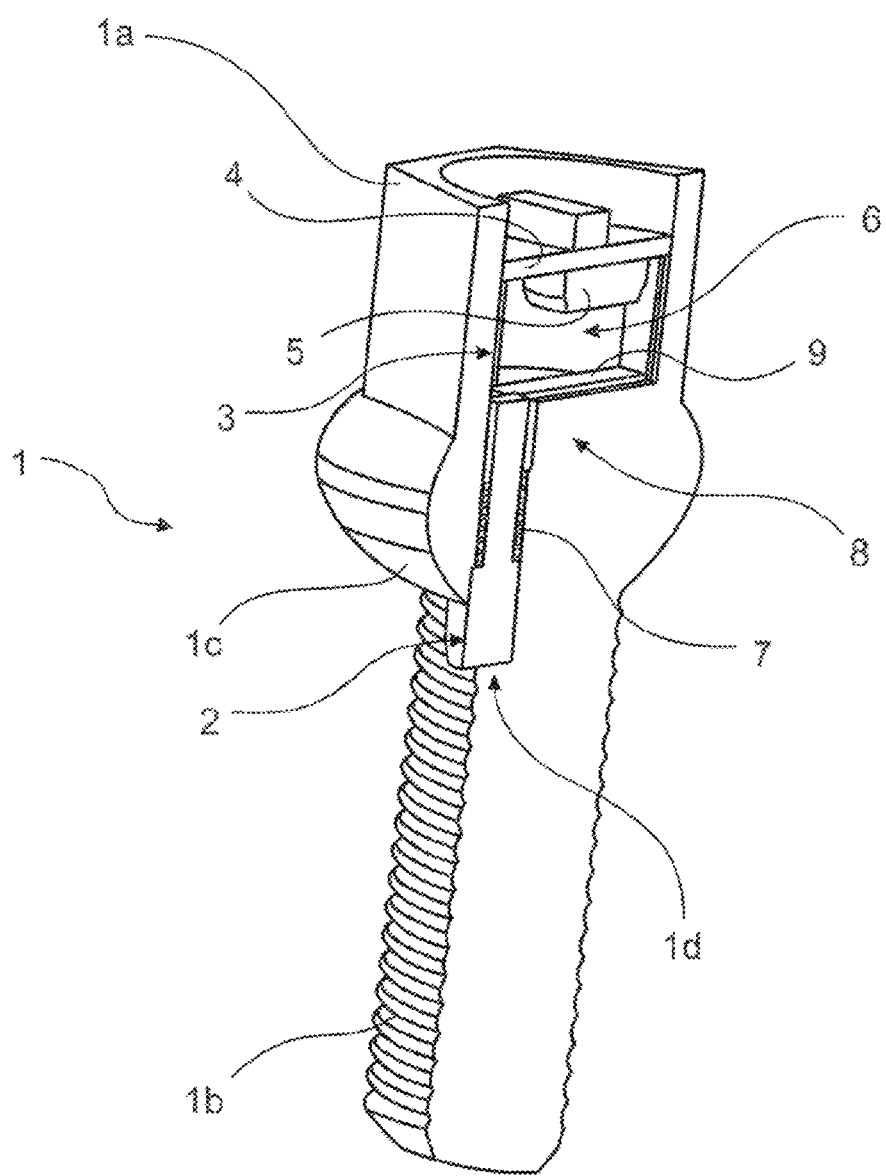
FIG. 2: shows a cut illustration of the fastener according to FIG. 1.

The wheel screw 1 is illustrated in a cut manner in FIG. 2, whereby identical parts as in the remaining drawings are provided with identical reference numerals. It can thereby not be seen from FIG. 1 that a switching contact 3, a transmitter 4, and a power supply unit 5 are arranged in the interior of the head 1a of the wheel screw 1. The transmitter 4 thereby closes a chamber 6 in the head 1a of the wheel screw 1. The switching contact 3 and the power supply unit 5 are arranged in the chamber.

It can further be seen in FIG. 2 that the actuating element 2 is held in the wheel screw 1 in a spring-loaded manner, wherein a spring element 7 associated with the actuating element 2 is maximally deflected, so that the actuating element 2 is not tensioned. Together, the actuating element 2, the spring element 7, the switching contact 3, and the power supply unit 5 thereby form a sensor 8, which, together with the transmitter 4, forms a monitoring device according to the invention.

The switching contact 3 is closed in FIG. 2, so that the transmitter 4 and the power supply unit 5 are electrically connected to one another via the switching contact 3. The transmitter 4 is thus supplied with current by the power supply unit 5 and transmits a signal in FIG. 1 and FIG. 2.

Figure 3:
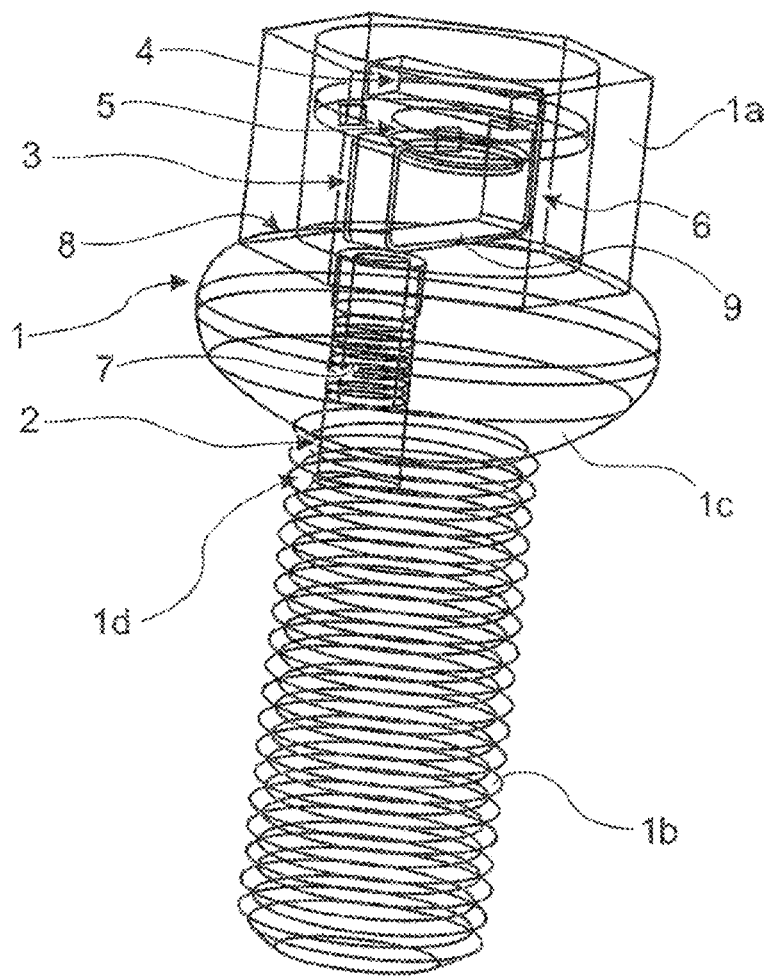
FIG. 3: shows a perspective comprehension drawing of the fastener according to FIG. 1 and FIG. 2 with all body edges.

FIG. 3 shows the same arrangement once against with all illustrated body edges of the wheel screw 1.

Figure 4:
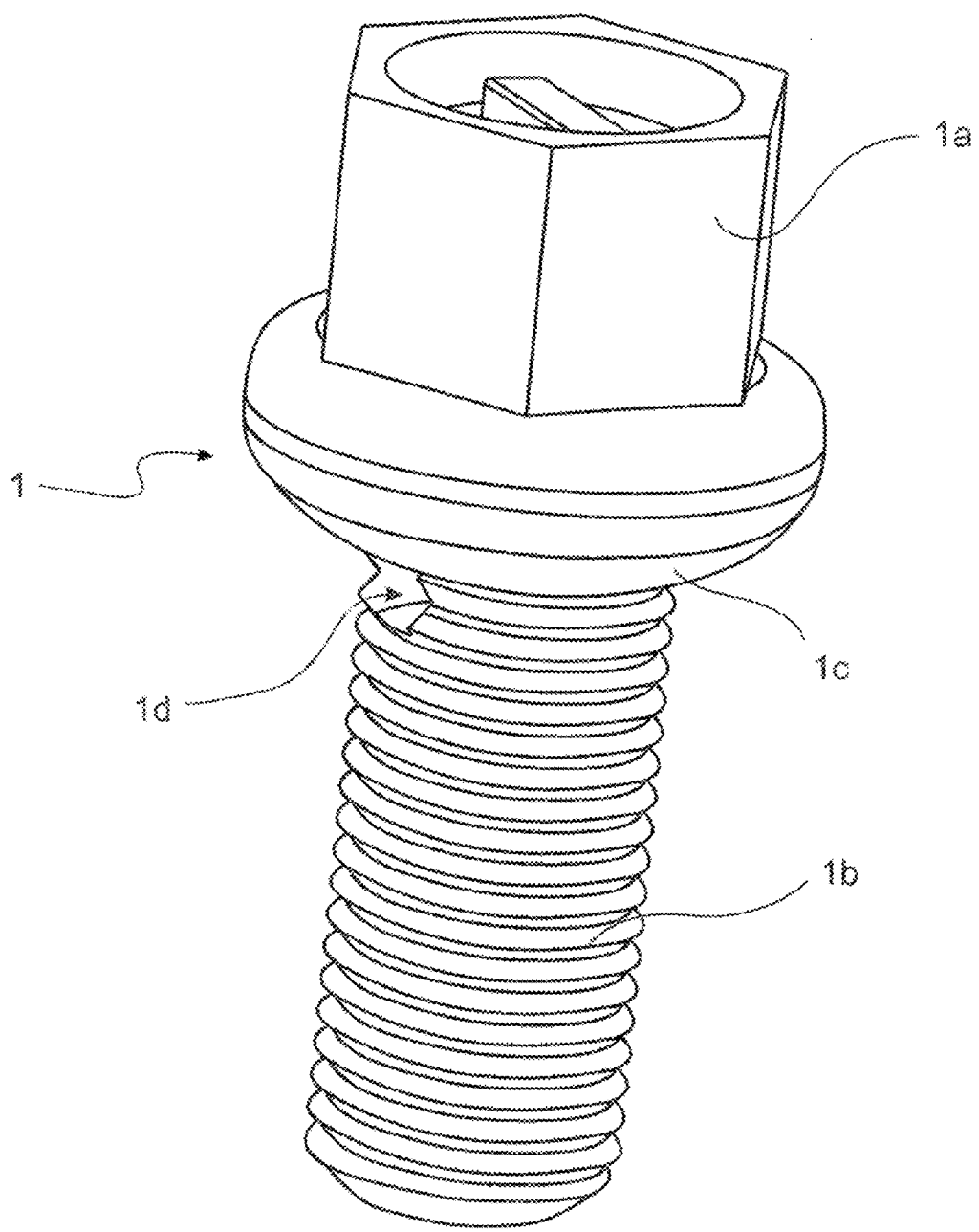
FIG. 4: shows a second perspective view of the first embodiment of the fastener according to the invention.
Figure 5:
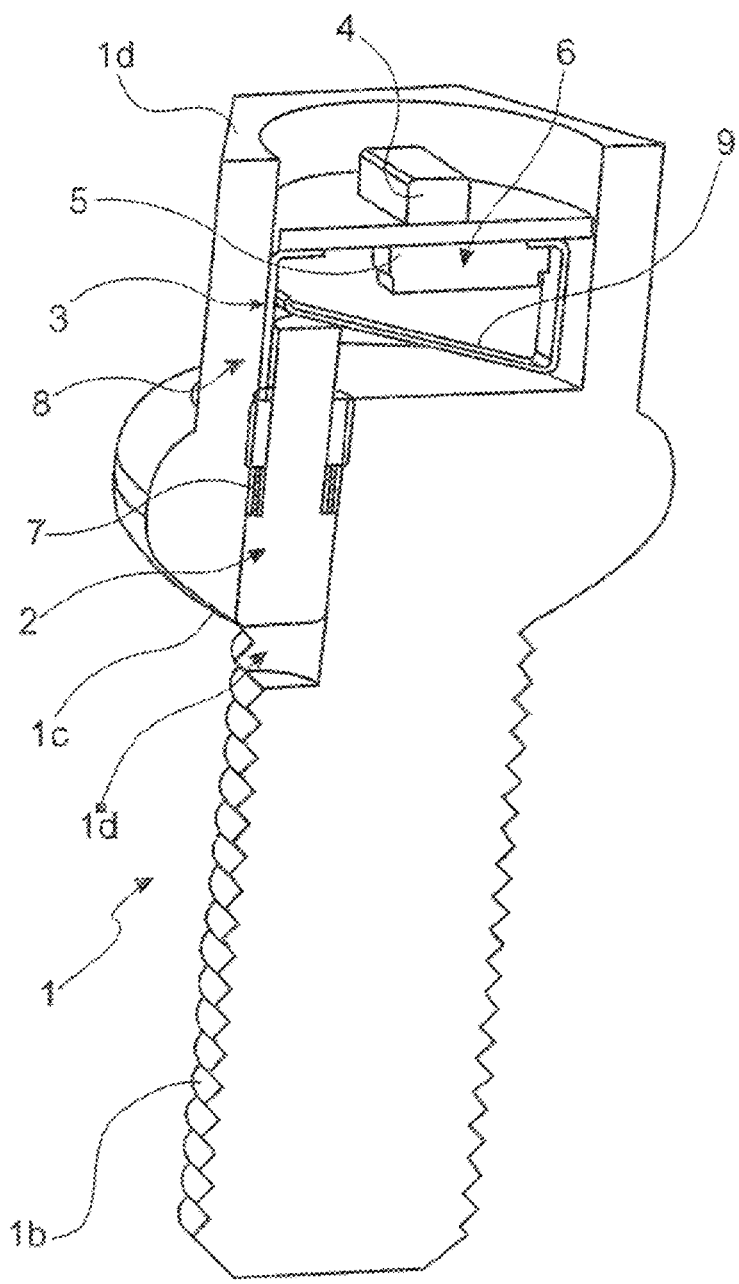
FIG. 5: shows a cut illustration of the fastener according to FIG. 4.
Figure 6:
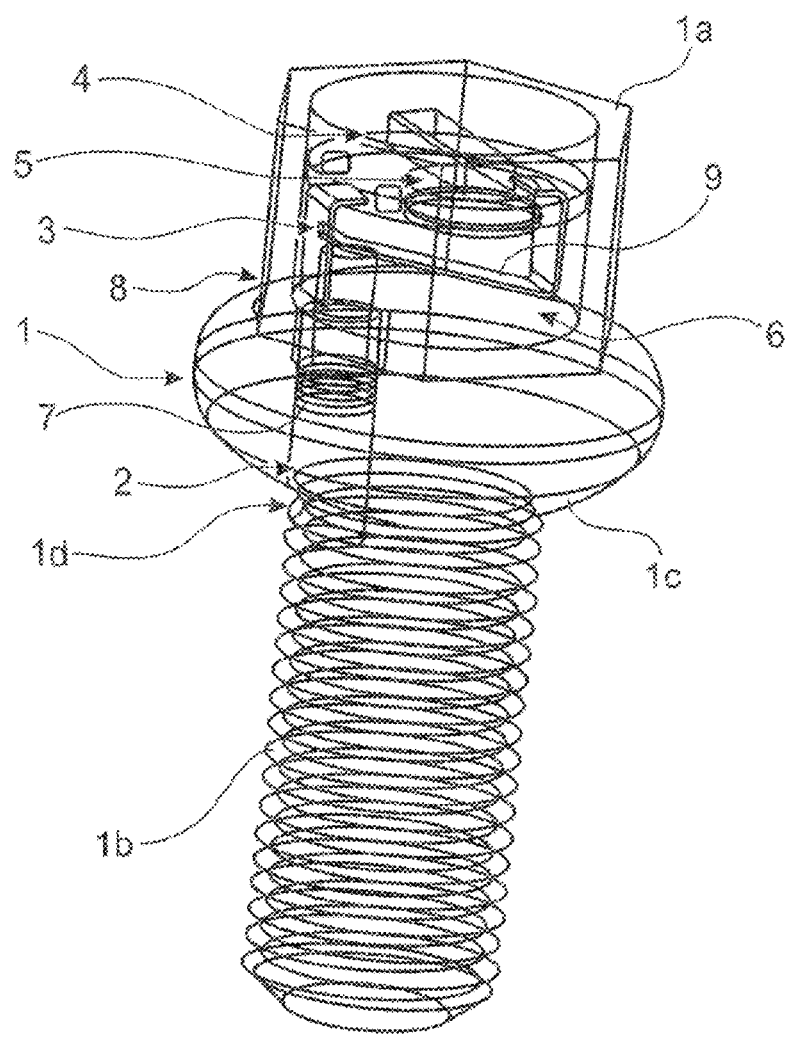
FIG. 6: shows a perspective comprehension drawing of the fastener according to FIG. 4 and FIG. 5 with all body edges.

The illustrations according to FIG. 4 to FIG. 6 differ from those in FIG. 1 to FIG. 3 in that the wheel screw 1 is illustrated in the form, when the wheel screw 1 is properly installed.

The actuating element 2 is thereby pushed into the wheel screw 1, so that only the recess 1d, in which the actuating element 2 is guided, is visible in FIG. 4.

The position of the actuating element 2 in the case of properly installed wheel screw 1 can in particular be seen from FIG. 5, whereby the spring element 7 is maximally compressed. The actuating element 2 now protrudes into the chamber 6 and pushes against the switching contact 3, whereby a one-sided, metallic lever 9 of the switching contact 3 is pivoted by means of the actuating element 2 in such a way that the electrical connection between the power supply unit 5 and the transmitter 4 is interrupted. The transmitter 4, which is now current-less, thus no longer transmits any signals and the transmitter 4 no longer requires power from the power supply unit 5, which is preferably formed as power store, as long as the wheel screw 1 is installed in its proper position.

FIG. 6 once again shows the same arrangement with interrupted switching contact 3 and current-less transmitter 4 as in FIG. 4 and FIG. 5, whereby all body edges of the wheel screw 1 are illustrated.

Figure 7:
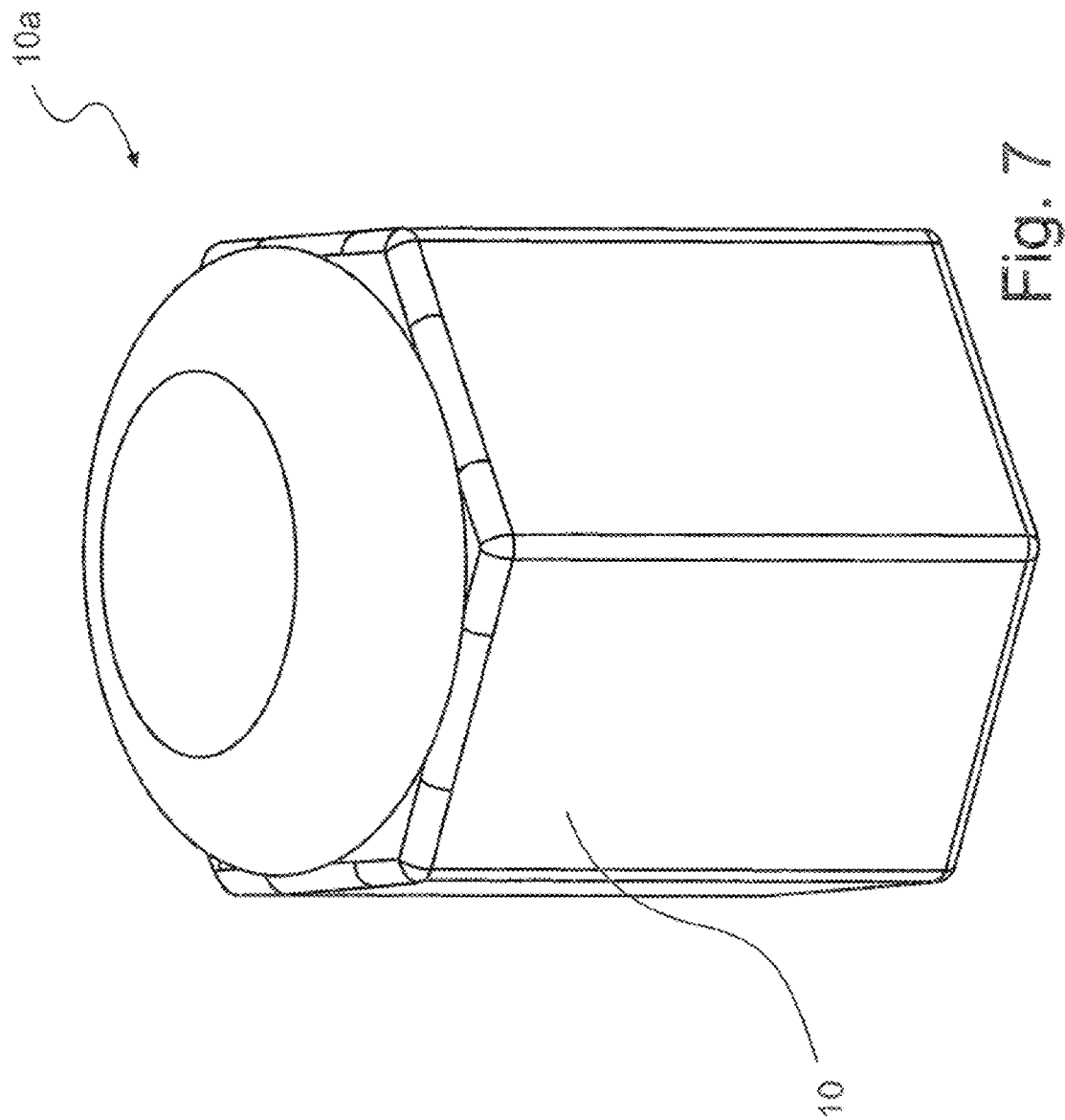
FIG. 7: shows a perspective illustration of a second embodiment of a fastener according to the invention.
Figure 8:
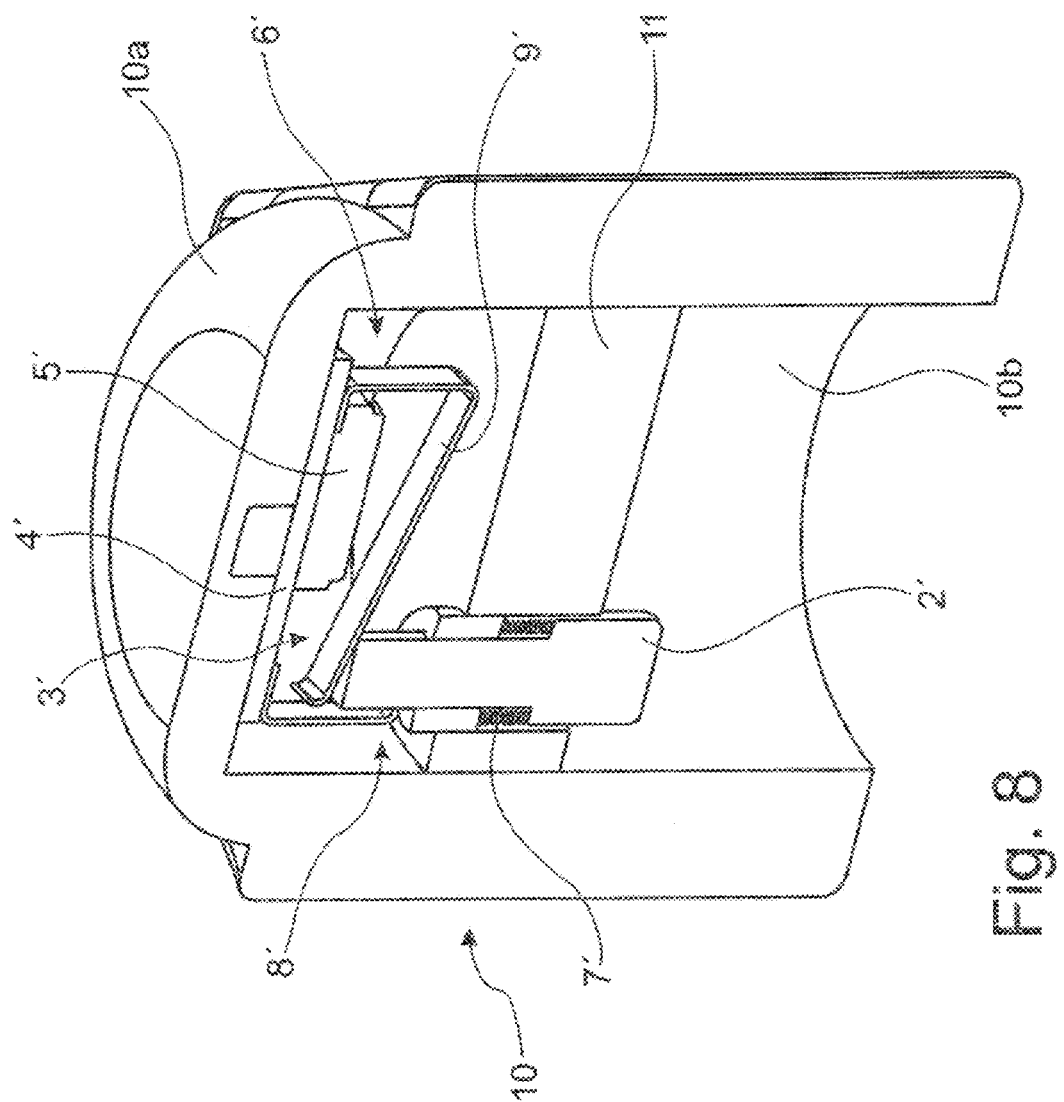
FIG. 8: shows a cut illustration of the fastener according to FIG. 7.
Figure 9:
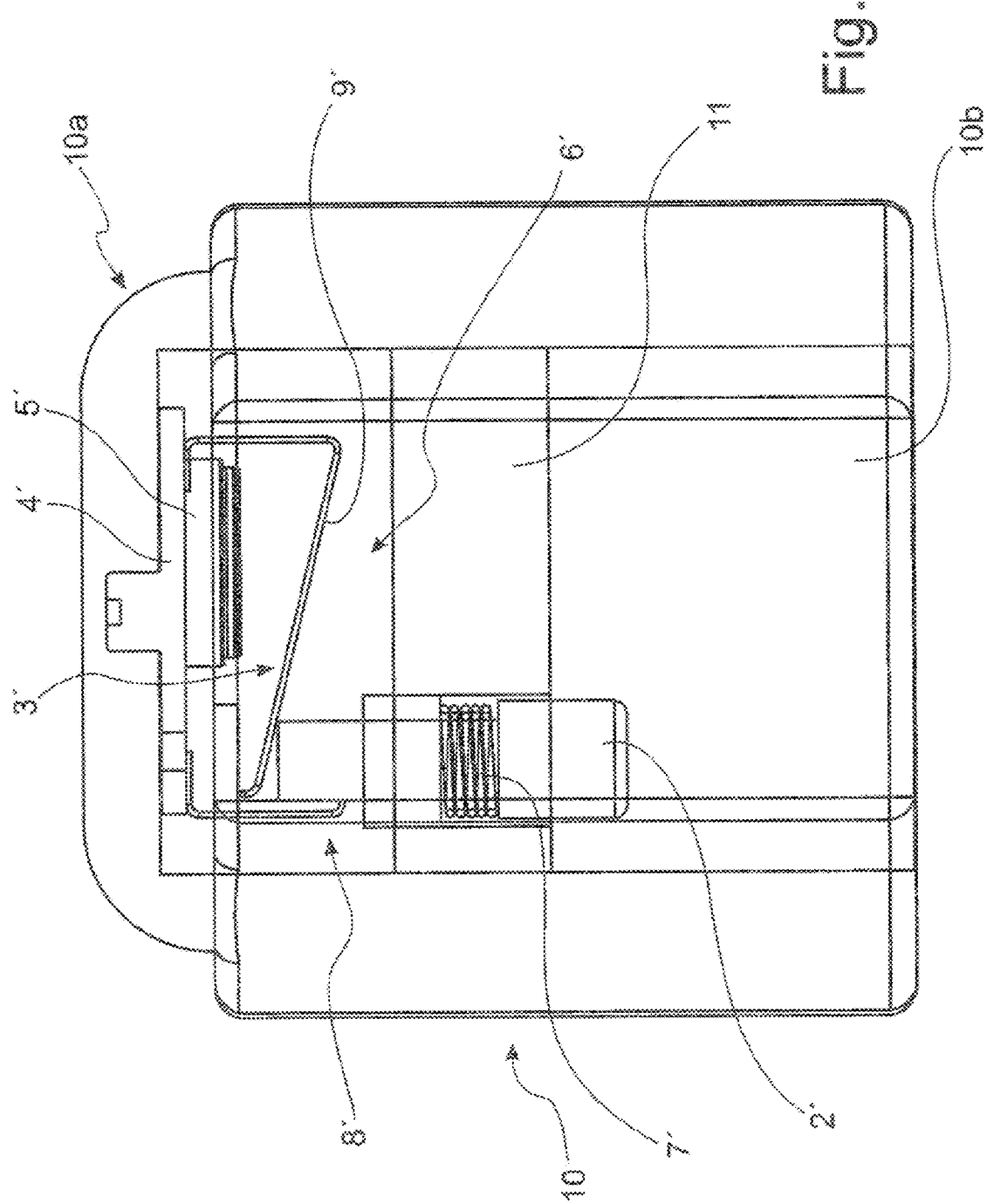
FIG. 9: shows a cross section through the fastener according to FIG. 7 and FIG. 8.

A second embodiment of the invention is illustrated in FIG. 7 to FIG. 9. Contrary to the first embodiment, the fastener is now formed as wheel nut 10. The wheel nut 10 thereby again has a head 10a comprising lateral hexagonal surfaces. At its head-side end, the wheel nut 10 is formed in a dome-shaped manner.

A chamber 6', which is formed in the interior of the wheel nut 10 and in which a transmitter 4', a switching contact 3', a power supply unit 5', and an actuating element 2', which is spring-loaded by means of a spring element 7', and which, together, form the monitoring device of transmitter 4' and sensor 8', as in FIGS. 1 to 6, can be seen from FIG. 8 and FIG. 9. The illustration in FIG. 8 and FIG. 9 thereby corresponds to that of FIG. 4 to FIG. 6 and shows the wheel nut 10 in screwed-on state. The actuating element 2' thereby pushes against the switching contact 3' in the same way as in FIG. 4 to FIG. 6, so that the transmitter 4' is current-less and does not transmit any signals. As long as the transmitter 4' is current-less, no power from the power supply unit 5' is used again.

The significant difference is thereby that the actuating element 2' is arranged in a front protrusion, which is formed as front plate 11 here. The front plate 11 thereby closes the chamber 6' to a head-side end of a thread 10b of the wheel nut 10. In their functionality, the two embodiments have the same effect.

When the wheel nut 10 is now released from a non-illustrated wheel bolt, the spring element 7' pushes the actuating element 2' in the direction of the internal thread of the wheel nut 10 and thus out of the chamber 6'. As soon as the actuating element 2' no longer pushes against the switching contact 3', in particular the one-sided, metallic lever 9' of the switching contact 3', said lever is pushed in the direction of the front plate 11 due to its internal stress, and the switching contact 3' is closed with both of its ends.

Figure 10:
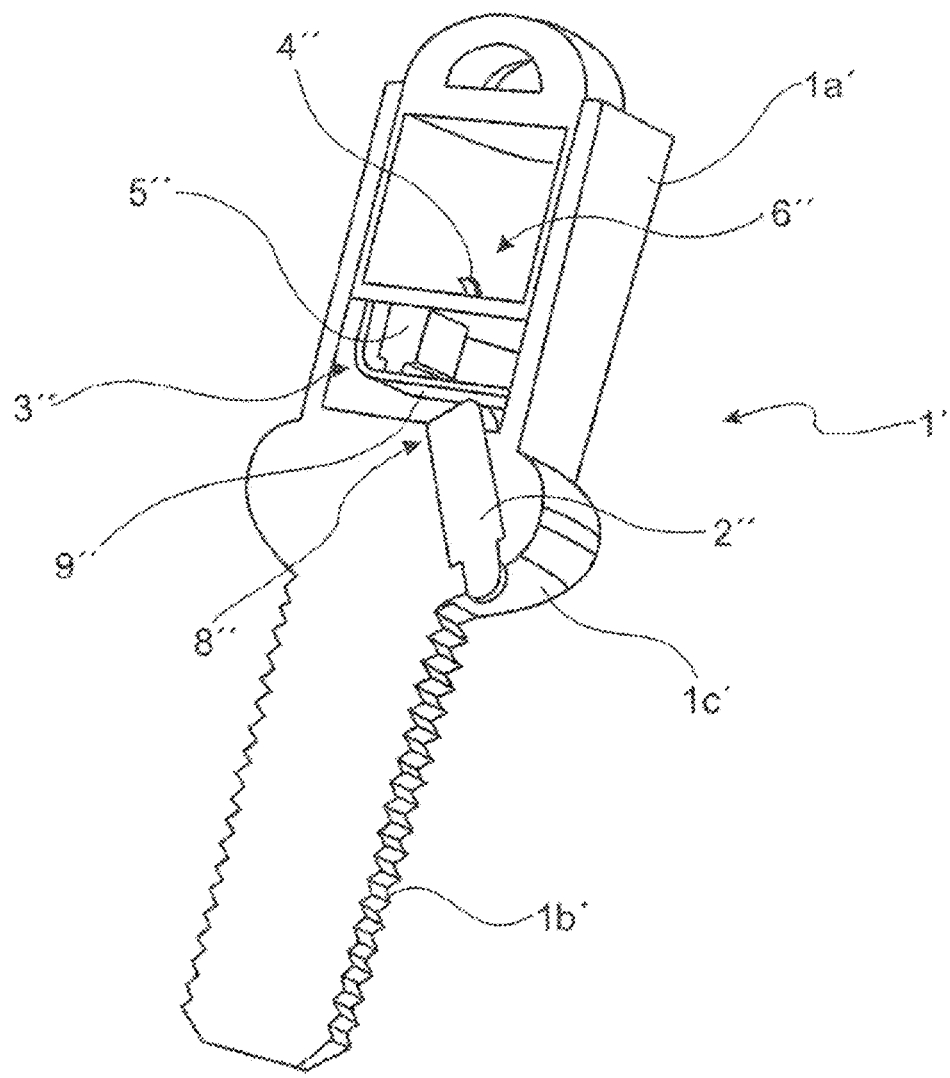
FIG. 10: shows a cut illustration of a third embodiment of a fastener according to the invention.

The fastener in FIG. 10 is a wheel screw 1' again. The wheel screw 1' is largely identical to the wheel screw 1 from FIG. 1 to FIG. 6. Reference numerals with identical numbers were therefore assigned to identical parts. The significant difference to the wheel screw 1 according to FIG. 1 to FIG. 6 is a differently arranged actuating element 2'', which can be displaced at an angle to the axis of rotation of the wheel screw 1' and which is guided out of the interior of the wheel screw 1' at the conical to spherical contact surface 1c'. The recess 1b' of the wheel screw 1 can thus advantageously be forgone. All further features correspond to the wheel screw 1 according to FIG. 1 to FIG. 6.

All of the features mentioned in the above description and in the claims can be combined with the features of the independent claims in any selection. The disclosure of the invention is thus not limited to the described or claimed feature combinations, respectively, on the contrary, all features combinations, which are expedient as part of the invention, are to be considered as being disclosed.

The invention claimed is:

1. A fastener, in particular of a chassis component, having at least one sensor and at least one transmitter of a monitoring device for monitoring at least one mechanical fastening parameter, wherein
    at least one power supply unit is associated with the transmitter,
    the transmitter and the power supply unit are connected to one another by means of a switching contact,
    an electrical connection can be closed by means of the switching contact,
    the switching contact is designed in such a way that the electrical connection is open when the fastener is installed properly and is closed only when the fastener is released, and
    the transmitter is supplied with current and transmits a signal only when the electrical connection of the switching contact is closed;
    wherein an actuating element is associated with the switching contact;
    wherein the actuating element is a spring-loaded pin, which is inclined at an angle to an axis of rotation of a thread of the fastener in such a way that the pin can be displaced in the direction of the axis of rotation.

2. The fastener according to claim 1, wherein the switching contact is formed by means of two ends of metallic strips, wherein at least one of the strips is bent and closes the switching contact by means of its internal stress.

3. The fastener according to claim 1, wherein the transmitter provides for a wireless signal transmission.

4. The fastener according to claim 1, wherein the monitoring device is installed in the fastener at an outer head end thereof.

5. The fastener according to claim 1, wherein at least the transmitter and the switching contact of the monitoring device are arranged in a chamber, which is sealed to the outside.

6. The fastener according to claim 1, wherein the fastener is a wheel screw.

7. The fastener according to claim 6, wherein in the thread, the wheel screw has a recess, which extends in the direction of the axis of rotation of its thread and in which the actuating element of the switching contact is guided.

8. The fastener according to claim 6, wherein the actuating element of the switching contact is guided out of the interior of the wheel screw to the outside at a conical to spherical contact surface of the wheel screw, which is formed between the head and thread of said wheel screw.

9. The fastener according to claim 1, wherein the fastener is a wheel nut.

10. The fastener according to claim 9, wherein the wheel nut has an internal front protrusion at a head-side end of its thread, at or in which an actuating element of the switching contact is held.

11. A device for monitoring a mechanical fastening, in particular of a chassis component, comprising at least one monitoring device, which has at least one sensor and at least one transmitter, and a notification device, which has a receiver associated with the transmitter of the monitoring device, a data processing unit, and an output unit,
wherein the monitoring device is installed in a fastener according to claim 1.

12. The device according to claim 11, wherein the output unit has means, by means of which a direct output of a warning or a transfer of corresponding information relating to the state of the mechanical connecting parameter is possible.

13. The device according to claim 11, wherein the output unit is integrated into a vehicle.

14. A fastener, in particular of a chassis component, having at least one sensor and at least one transmitter of a monitoring device for monitoring at least one mechanical fastening parameter, wherein
at least one power supply unit is associated with the transmitter,
the transmitter and the power supply unit are connected to one another by means of a switching contact,
an electrical connection can be closed by means of the switching contact,
the switching contact is designed in such a way that the electrical connection is open when the fastener is installed properly and is closed only when the fastener is released, and
the transmitter is supplied with current and transmits a signal only when the electrical connection of the switching contact is closed;
wherein the actuating element is a spring-loaded pin, which can be displaced parallel to an axis of rotation of a thread of the fastener.

\* \* \* \* \*